United States Patent Office 3,849,540
Patented Nov. 19, 1974

3,849,540
METHOD OF SWEETENING NATURAL GAS
Jim Maddox, Jr., and Fan-Sheng Tao, Houston, Tex.,
assignors to Texaco Inc., New York, N.Y.
No Drawing. Filed June 19, 1972, Ser. No. 263,912
Int. Cl. B01d 53/34
U.S. Cl. 423—224
15 Claims

ABSTRACT OF THE DISCLOSURE

A process for removing hydrogen sulfide from natural gas by removing the hydrogen sulfide present using a catalytic reaction. The process comprises aeration of a catalyst containing aqueous solution, removal of undissolved oxygen from the solution and treatment of a hydrogen sulfide containing natural gas with the aerated solution. The resulting natural gas is practically free of hydrogen sulfide and oxygen.

BACKGROUND OF THE INVENTION

This invention pertains to the field of hydrogen sulfide removal from natural gas.

Natural gas is produced from hydrocarbon reservoirs and is a mixture of components which varies with locality. In general it is a mixture of light hydrocarbons of the paraffinic type. Usually methane, ethane, propane, butane and some higher hydrocarbons are major components. Natural gas which has been in contact with petroleum in the reservoir usually has a higher proportion of higher molecular weight hydrocarbons than does natural gas produced from a reservoir containing no petroleum. Accompanying the natural gas there is often a high percentage of impurities such as water vapor, nitrogen, carbon dioxide and hydrogen sulfide. Upon reaching the surface of the earth through wells which penetrate to the reservoirs, the natural gas is processed to remove most of the hydrocarbons except methane. These products may be separately marketed. The impurities present in natural gas must also be removed. One impurity which is a particular problem is hydrogen sulfide.

Hydrogen sulfide is not only a diluent to the fuel value of natural gas, but is also a pollutant. Even a small amount of hydrogen sulfide in natural gas will give it the characteristically offensive odor of rotten eggs. Because of this processes have been developed to remove hydrogen sulfide from natural gas. The removal of hydrogen sulfide from natural gas is generally referred to as sweetening the gas. For example, alkanolamines may be used to react with the hydrogen sulfide. The Giammarco-Vetrocoke process uses a mixture of alkali metal carbonates and arsenites and arsenate to remove the hydrogen sulfide. These processes perform well within their limits but are hampered by the fact that the major ingredients must be regenerated which involves a complicated system of equipment and controls.

Processes which provide for catalytic oxidation of aqueous solutions containing hydrogen sulfide are disclosed in U.S. Pat. 3,576,738 and applications Ser. No. 199,780, filed Nov. 17, 1971; Ser. No. 199,777, filed Nov. 17, 1971, and Ser. No. 199,779 filed Nov. 17, 1971. However, these processes are not directed to separating hydrogen sulfide from a mixture of gases but are concerned only with hydrogen sulfide already present in an aqueous solution.

Details of several prior art processes for treating mixtures of hydrogen sulfide and other gases are disclosed in the literature. See for example, The Oil and Gas Journal, Aug. 14, 1967; p. 131; The Oil and Gas Journal, June 3, 1968, p. 90; and Chemical Engineering, May 15, 1972, p. 66.

The present invention is a novel process which overcomes the complications of the prior art by providing for a catalytic process which converts hydrogen sulfide in natural gas to elemental sulfur. Little or no regeneration of the active ingredients is needed, and easily handled materials and equipment may be used.

SUMMARY OF THE INVENTION

The invention si a process for removing hydrogen sulfide from natural gas comprising treating natural gas containing hydrogen sulfide with an aqueous solution containing dissolved transition metal catalyst and dissolved oxygen under conditions which insure a minimum of oxygen in the natural gas after treatment.

DESCRIPTION OF THE PREFERRED EMBODIMENT

The gas mixture to be treated in order to remove hydrogen sulfide may be any gas mixture. It is specifically preferred in this invention to remove hydrogen sulfide from natural gas. As explained, supra, natural gas may comprise a variety of hydrocarbons and also other gases such as carbon dioxide, nitrogen, and hydrogen sulfide. The present process chemically converts the hydrogen sulfide to elemental sulfur and leaves the other major components of the gas relatively undisturbed. It will be obvious to one skilled in the art referring to the teachings contained herein that the process of this invention will remove hydrogen sulfide from gas mixtures other than those specifically mentioned or claimed herein: For example, gas mixtures comprising hydrogen sulfide and carbon dioxide will perform in a similar manner in this invention to gas mixtures comprising hydrogen sulfide and methane, the principal constituent of natural gas. This is so since both methane and carbon dioxide are inert to the reaction between hydrogen sulfide and oxygen.

The aqueous solution used to treat the incoming gas stream containing hydrogen sulfide must contain a dissolved catalytic quantity of a soluble transition metal catalyst. An ion of a transition metal is preferred. The usual form of such a catalyst is a salt. Soluble salts of nickel, cobalt, manganese, copper and iron, for example, are suitable for the operation of this invention. It is especially preferred to use a nickel catalyst.

The amount of catalyst to be used must be large enough to impart catalytic activity and promote the reaction between hydrogen sulfide and oxygen. Amounts as low as 1 part by weight of catalyst per 2000 parts of hydrogen sulfide to be treated may be used. Any amount up to the limit of solubility of the catalyst in the aqueous solution may be used. As a practical matter amounts much above 1 part of catalyst per 20 parts of hydrogen sulfide may not appreciably improve catalytic activity. It is preferred to use from about 1 part of catalyst to 50 parts of hydrogen sulfide to about 1 part of catalyst to about 200 parts of hydrogen sulfide.

Oxygen must be dissolved in the aqueous solution in an amount sufficient to stoichiometrically react with the hydrogen sulfide in the gas to be treated. An excess of oxygen may be used to insure more complete reaction of hydrogen sulfide. The oxygen may be dissolved in the aqueous solution by a conventional means of contacting water and oxygen. This may be at atmospheric or higher pressures. Conventional gas-liquid contacting means may be used to dissolve the oxygen in the water including static mixers, spray towers and packed towers. The source of the oxygen may be any convenient source including air, pure oxygen, or a mixture of oxygen and inert gases.

The process of this invention may be carried out in several ways. In general the essential step is treating the hydrogen sulfide containing gas with an aqueous solution of soluble transition metal catalyst and oxygen to react the hydrogen sulfide with the oxygen. In the ideal situation all of the hydrogen sulfide reacts completely with all of the dissolved oxygen, and the treated gas, natural gas for instance, does not contain appreciable amounts of either oxygen or hydrogen sulfide.

In the broadest embodiment of this invention the aqueous solution of dissolved oxygen and catalyst is intimately contacted with the hydrogen sulfide containing gas in order to dissolve most or all of the hydrogen sulfide so that it may react with the oxygen. This may be done in conventional gas-liquid contacting devices such as packed towers, spray towers and/or bubble tanks. The process of dissolution may take place at atmospheric pressures or above. The temperature of the aqueous solution may be adjusted to maintain the desired reaction rate balanced with optimum gas absorbing capacity.

In a more specific embodiment of this invention the addition to the aqueous solution of a base or buffering compound will enable more hydrogen sulfide to be retained by the aqueous solution and thus have an enhanced opportunity to react with the dissolved oxygen. This base or buffering compound may be any known to the art including alkali metal hydroxides, bicarbonate salts, carbonate salts and the like.

In order to remove a desired amount of hydrogen sulfide from a given stream of gas it may in some cases be necessary to treat the stream of gas with an aqueous solution of catalyst and oxygen more than one time. The treated gas stream is collected and treated again until the desired level of hydrogen sulfide is reached. The same treating solution or different solutions in series may be used.

In a particularly preferred embodiment of this invention, in order to minimize the amount of oxygen in the treated stream of gas, it may be necessary to remove entrained but undissolved oxygen in the aqueous solution before treating the gas stream containing hydrogen sulfide. This may be done, for example, by allowing the entrained but undissolved oxygen to escape from the aqueous solution after oxygen dissolution and before treating the hydrogen sulfide containing gas.

The oxygen, for example, may be dissolved in a solution of water and transition metal catalyst in one vessel and then this solution transferred to another vessel. During transfer, time is allowed for entrained but undissolved oxygen to escape from the aqueous solution. Then hydrogen sulfide containing gas is contacted with the oxygen rich catalyst containing aqueous solution. Due to the absence of entrained but undissolved oxygen little stripping of oxygen results and the treated gas is relatively free of oxygen. If desired, the water may then be recycled and reoxygenated for use again.

Experimental

A contactor comprising a vertical glass tube filled with glass beads was used as follows:

An aqueous solution of oxygen and nickel chloride was passed through the top of the contactor and proceeded through the contactor and out the bottom. A gas comprising 95.5% carbon dioxide and 4.5% hydrogen sulfide was bubbled into the bottom of the contactor in a counter current manner to the flow of the aqueous solution.

Five runs were made. In the first the aqueous solution contained only oxygen. In the second and third runs the aqueous solution contained oxygen and sodium bicarbonate. In the fourth run the aqueous solution contained oxygen and nickel chloride catalyst. In the fifth run the aqueous solution contained oxygen, a nickel chloride catalyst and sodium bicarbonate.

As is evident, the ability of the aqueous solutions to remove hydrogen sulfide increased from runs one to five.

| Run | $H_2S$ as percent of gas Before treatment | $H_2S$ as percent of gas After treatment | Content of aqueous solution contacting 95.5% carbon dioxide, 4.5% hydrogen sulfide gas |
|---|---|---|---|
| 1 | 4.5 | 2.92 | Oxygen. |
| 2 | 4.5 | 2.65 | Oxygen, sodium bicarbonate. |
| 3 | 4.5 | 2.02 | Do. |
| 4 | 4.5 | 1.70 | Oxygen, nickel chloride. |
| 5 | 4.5 | 0.27 | Oxygen, nickel chloride, sodium bicarbonate. |

What is claimed is:

1. A process for removing hydrogen sulfide from natural gas comprising:
   (a) oxygenating an aqueous solution consisting of a soluble catalyst, said catalyst consisting of transition metal compounds selected from the group consisting of salts of nickel, cobalt, manganese, copper, and iron,
   (b) removing entrained but undissolved oxygen from the aqueous solution and
   (c) treating hydrogen sulfide containing natural gas with the oxygen rich aqueous solution of step (b) at atmospheric pressure.

2. A process as in claim 1 wherein the hydrogen sulfide containing natural gas is sequentially treated in a plurality of said aqueous solutions of dissolved oxygen and nickel catalyst.

3. A process of claim 1 wherein the temperature is about ambient.

4. A process as in claim 1 wherein the amount of dissolved oxygen is at least stoichiometric to the amount of hydrogen sulfide to be treated.

5. A process as in claim 1 wherein the treated hydrogen sulfide containing natural gas is recycled through the aqueous solution after treatment until a desired level of hydrogen sulfide is attained.

6. A process for removing hydrogen sulfide from natural gas comprising treating at atmospheric pressure natural gas containing hydrogen sulfide with an aqueous solution consisting of a catalytic quantity of dissolved nickel catalyst and dissolved oxygen wherein the aqueous solution containing dissolved oxygen is substantially free of entrained but undissolved oxygen before treating the natural gas containing hydrogen sulfide.

7. A process as in claim 6 wherein there are a plurality of said aqueous solutions and the natural gas containing hydrogen sulfide is treated sequentially by each aqueous solution.

8. A process as in claim 6 wherein the temperature is about ambient.

9. A process as in claim 6 wherein the amount of dissolved oxygen is at least stoichiometric to the amount of hydrogen sulfide to be treated.

10. A process as in claim 6 wherein the natural gas containing hydrogen sulfide is recycled back through the aqueous solution after treatment until a desired level of hydrogen sulfide is attained.

11. A process for removing hydrogen sulfide from natural gas comprising:
   (a) oxygenating an aqueous solution consisting of a soluble nickel catalyst,
   (b) removing entrained but undissolved oxygen from the aqueous solution and
   (c) treating at atmospheric pressure hydrogen sulfide containing natural gas with the oxygen rich aqueous solution of Step (b).

12. A process as in claim 11 wherein the hydrogen sulfide containing natural gas sequentially is treated in a plurality of said aqueous solutions of dissolved oxygen and nickel catalyst.

13. A process as in claim 11 wherein the temperature is about ambient.

14. A process as in claim 11 wherein the amount of dissolved oxygen is at least stoichiometric to the amount of hydrogen sulfide to be treated.

15. A process as in claim 11 wherein the treated hydrogen sulfide containing natural gas is recycled through the aqueous solution after treatment until a desired level of hydrogen sulfide is attained.

References Cited

UNITED STATES PATENTS

| | | | |
|---|---|---|---|
| 3,087,793 | 4/1963 | Hay | 423—573 |
| 3,642,448 | 2/1972 | Beavon | 423—573 |
| 1,436,196 | 11/1922 | Ramsberg | 423—232 |
| 1,732,905 | 10/1929 | Morgan et al. | 423—232 |
| 2,019,468 | 10/1935 | Bacon | 423—234 |

FOREIGN PATENTS

| | | | |
|---|---|---|---|
| 1,182,255 | 2/1970 | Great Britain | 55—73 |

EARL G. THOMAS, Primary Examiner

U.S. Cl. X.R.

423—573